United States Patent [19]
Uhlig

[11] 3,737,277
[45] June 5, 1973

[54] MOLD STRUCTURE FOR MOLDING SKIRTED CLOSURES HAVING INTEGRAL LUGS ON THE INSIDE SURFACE THEREOF

[76] Inventor: Gerhardt E. Uhlig, 5875 North Yermo, Apt. E-4, Toledo, Ohio 43613

[22] Filed: July 19, 1971

[21] Appl. No.: 163,798

[52] U.S. Cl. ............... 425/438, 425/242, 425/249, 249/59
[51] Int. Cl. .......... B29c 1/00, B29d 1/00, B29f 1/14, B29g 1/00
[58] Field of Search ...................... 425/242, 249; 249/59, 438

[56] References Cited
UNITED STATES PATENTS

| | | | |
|---|---|---|---|
| 3,013,308 | 12/1961 | Armour | 425/242 X |
| 3,344,942 | 10/1967 | Hedgewick | 425/242 X |
| 3,373,479 | 3/1968 | Watt et al. | 425/59 UX |
| 3,461,488 | 8/1969 | Croyle | 425/249 |
| 3,482,815 | 12/1969 | Natueale | 425/414 X |
| 3,555,606 | 1/1971 | Hedgewick | 425/242 |
| 3,584,111 | 6/1971 | Allison | 425/438 X |

FOREIGN PATENTS OR APPLICATIONS

| | | | |
|---|---|---|---|
| 240,079 | 2/1961 | Australia | 249/59 |
| 1,270,357 | 7/1961 | France | 249/59 |

*Primary Examiner*—J. Howard Flint, Jr.
*Attorney*—Paul F. Stutz

[57] ABSTRACT

A mold structure for forming skirted closure caps having lock lugs thereon. said structure featuring principally a pair of axially reciprocable telescoping members, the inner serving as a principal molding core, said members being capable of telescoped relationship by reason of recessed peripheral regions on the one and intermeshing fingers on the other, said fingers and recesses cooperating to leave voids definitive of said lugs, said members being disengageable through a combination of axial and rotary movement to free said lug from said void.

16 Claims, 17 Drawing Figures

3,737,277

Patented Jun 5 1973

INVENTER.
GERHARDT E. UHLIG
BY Paul B. Stutz

INVENTER.
GERHARDT E. UHLIG

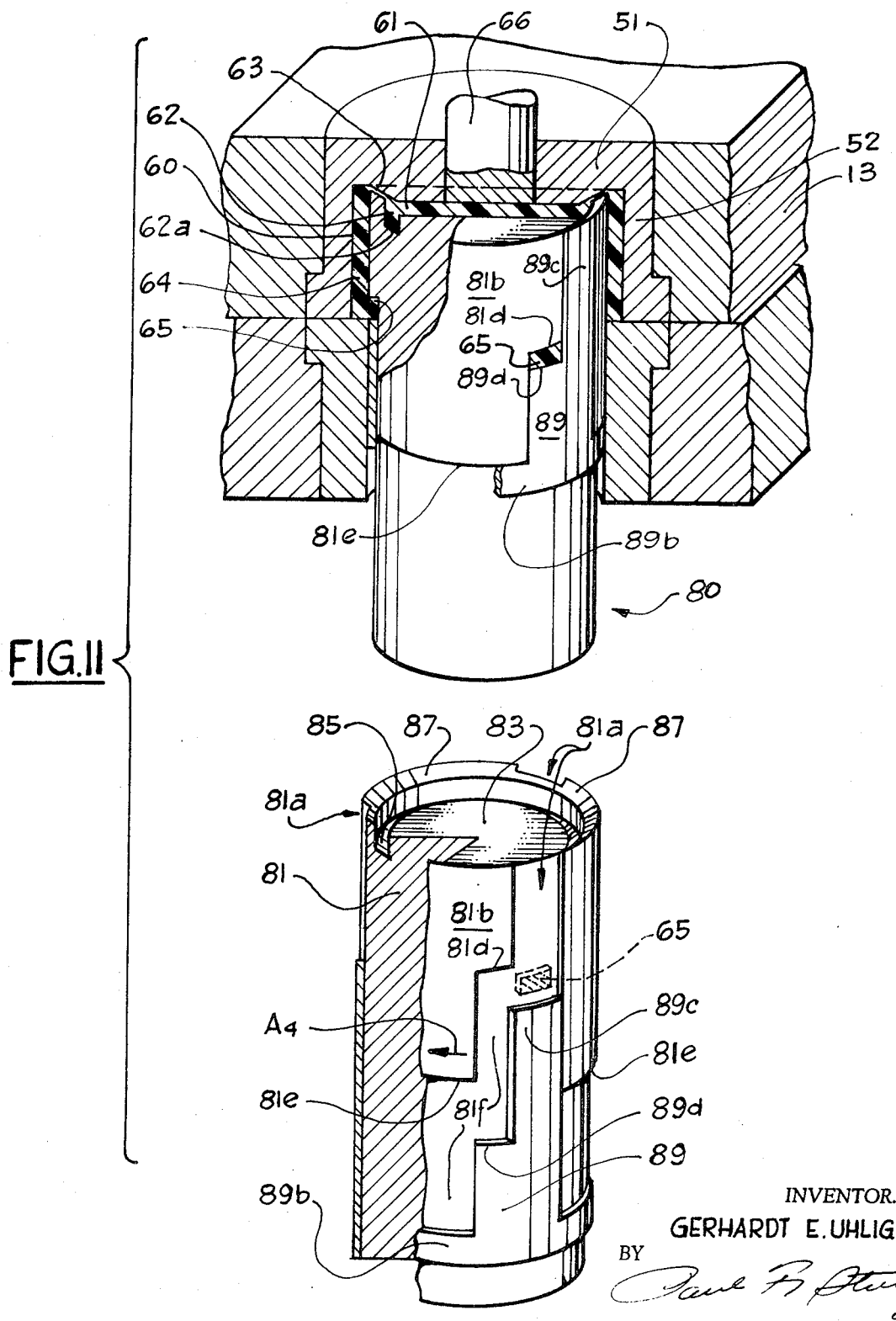

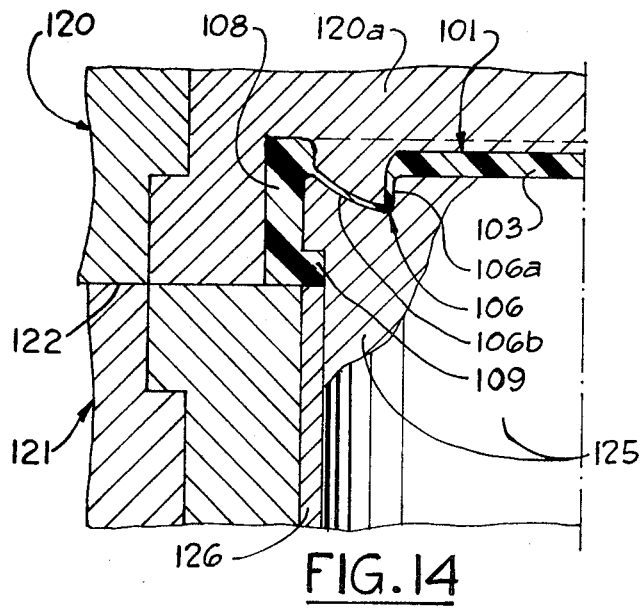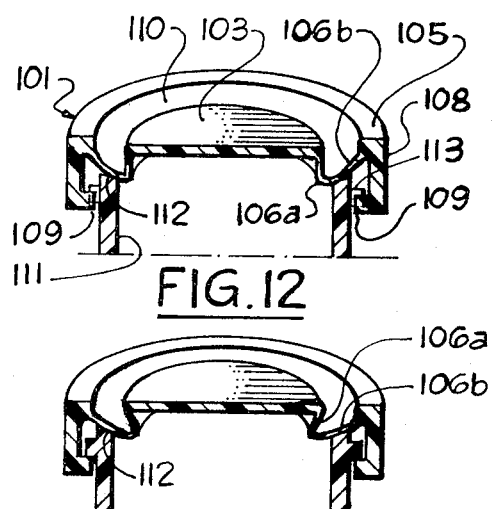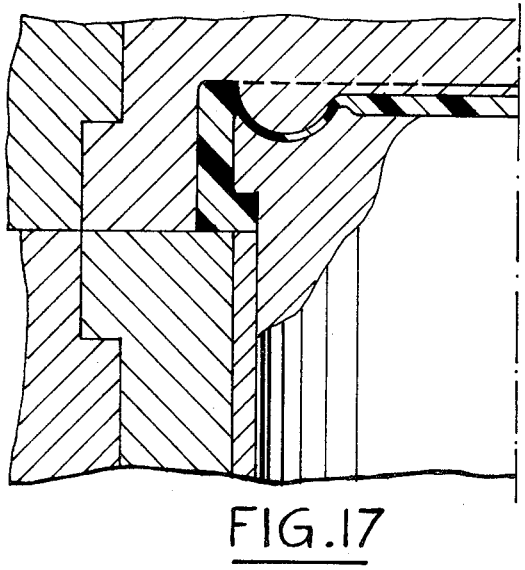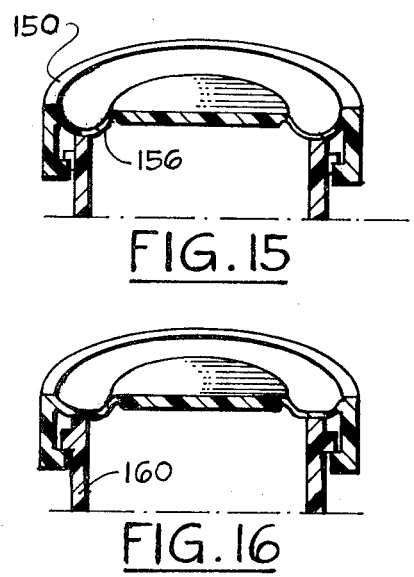

MOLD STRUCTURE FOR MOLDING SKIRTED CLOSURES HAVING INTEGRAL LUGS ON THE INSIDE SURFACE THEREOF

The present invention relates to a molding apparatus structure. More particularly, the present invention relates to a mold core structure adapted, in combination with a cooperating female mold, to form closures formed of moldable material such as, but not limited to, plastics of the thermoplastic and the thermosetting type. Even more particularly, the present invention relates to such a structure which is peculiarly and uniquely adapted for the molding of such closure caps which feature a depending skirt or skirts and on one of said depending skirts at least one, usually several, radially spaced locking lugs.

Closures of this type are described in my copending patent application Ser. No. 16,427 filed May 4, 1970, entitled "Safety Closure Container" and now abandoned in favor of continuation application, Ser. No. 288,129, filed Sept. 11, 1972, and reference may be had thereto for further details and constructional features as to which the mold structures herein are uniquely designed for manufacture thereof.

As described more fully therein, problems associated with the packaging of products inherently dangerous to children have become more acute, leading to the development of a variety of containers, closures and container/closure combinations which are designed to provide a package for such products which are not easily opened by children but require some purposeful mind-/action manipulation designed hopefully to be beyond the ability of the child of tender years or the aged unfirm of insufficient strength or dexterity.

Many of the closures developed to date are fairly complex and intricate, involving difficulties in molding and consequent molding expense. Other closures and closure arrangements are composed of more than one piece. This necessitates extra assembly time and, as well, statistically increases the chances of obtaining an imperfect composite. The molding of closures in accordance with the present invention, including the closures descirbed in my referred-to copending application, result in one-piece closures which fortuitously involve lower cost, easier assembly through elimination of plural assembly steps and more uniformity.

In addition, of course, a one-piece closure is capable of design in such manner as better insures accuracy of dimensional detail and dimensional relationship of, for example, the closure surface, the lug members and the threads; all of which cooperate in an ultimately desired closure cap to provide efficient leak-proof closing, self-locking and, as well, proper purposeful disengagement.

It is a particular object of the present invention to provide a molding core structure composed of movable interdependent parts which cooperate with an essentially simple female mold cavity to provide for the molding of a projecting lug on a depending skirt of a closure cap and which interdependent moving parts are capable of manipulation in a simple, facile manner as will allow their disengagement removal from the molded part without damage to the lug or any deflection or without stress being placed thereon as may otherwise weaken the lug such that it would fail in service in its ultimate application.

It is another object of the present invention to provide a molding combination core/sleeve structure which features telescopic engagement of an outer sleeve with an inner segmented core; the sleeve being axially disengageable and rotatably disengageable from the molded part.

It is still another object of the present invention to provide such a molding structure which is of relatively simple design such that the relative movement of the parts can be controlled and effected in a convenient manner as lends speed and rapidity to the parts concerned, specifically closure caps.

As indicated hereinabove, the closure caps featuring locking devices, specifically lugs, which the mold structures of the present invention are particularly designed to manufacture are described in considerably more detail in the referred-to copending application Ser. No. 16,427 and reference may be had thereto for a more complete description of their details of construction and details of their applied use.

The foregoing, as well as other objects of the present invention, will become apparent to those skilled in the art from the following detailed description taken in conjunction with the annexed sheets of drawings on which there are presented, for purposes of illustration only, several embodiments of the present invention.

IN THE DRAWINGS

Figure 10:
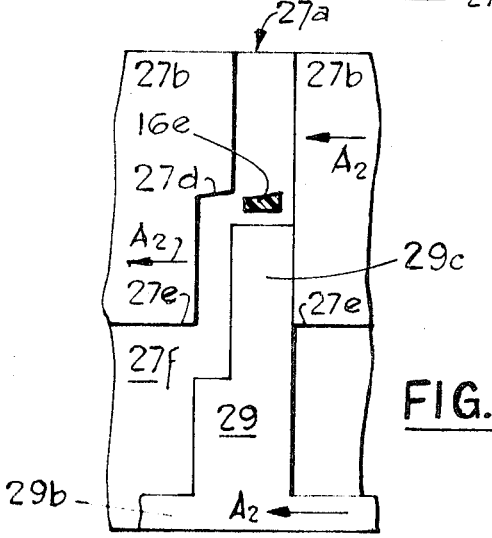

FIG. 10 constitutes a schematic exploded view, partly in perspective and partly sectional, showing the individual configuration of the component parts of the mold structure of the present invention in accordance with one embodiment thereof;

FIG. 11 is a view similar to FIG. 10, that is, a schematic exploded, partly in perspective and partly sectional view, of a mold apparatus featuring a mold core structure in accordance with a further embodiment of the present invention;

FIG. 12 is a schematic, perspective view, partly in section, of a closure cap featuring constructional details made possible by the mold core structure of the embodiment of FIG. 11;

FIG. 13 is a view similar to FIG. 12 but showing the closure cap sealingly applied to a container;

FIG. 14 is a side sectional view of a mold structure adapted for forming the closure cap illustrated in FIGS. 12 and 13;

FIG. 15 is a view similar to FIG. 12 but of another closure cap featuring different constructional details permitted by the molding technique of FIG. 11;

FIG. 16 is a view similar to FIG. 14 but showing the closure cap of FIG. 15 sealingly applied to a container; and FIG. 17 is a side sectional view of a mold structure adapted for forming the closure cap illustrated in FIGS. 15 and 16.

Viewed most simply, the present invention envisions a novel mold structure designed for the purpose of permitting rapid molding of a one-piece closure cap featuring an inner lug on the interior surface of a depending skirt by the expedient of a pair of intermeshing telescoping mold core sleeve members which are axially reciprocable and having mating configurations designed as to define, between mating edges thereof, a void or cavity definitive of the lug, said component parts being axially shiftable and rotatable, defining, in the disengagement thereof, an ultimate grooved path accommodating the molded closure cap lug.

Reference may now be had to the detailed drawings for a better understanding of the mold structure of the present invention in accordance with a principal embodiment thereof as illustrated in FIGS. 1–10, wherein the same numbers are employed to identify the same parts and constructional features throughout.

Figure 1:
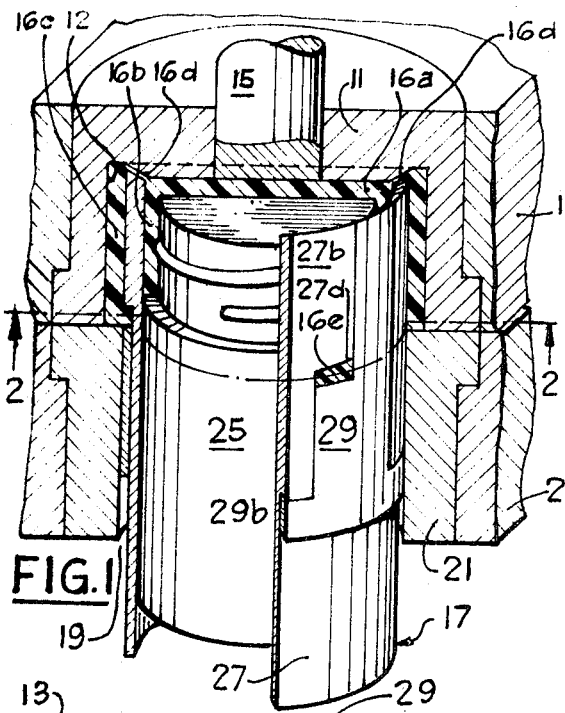
FIG. 1 is a schematic sectional view, with parts broken away, of a mold structure in accordance with one embodiment of the present invention, shown with the mold members in engaged closure cap forming relationship but with segments being partially broken away to show the interior interrelationship of the mold members and molded parts.

In FIG. 1, reference numeral 11 designates an upper mold insert embedded in insert holder 13 and featuring a bored female cavity 12. Reference numeral 15 identifies a knock-out rod for the closure cap 16; the latter featuring a top wall 16a, an inner dependent skirt 16b, an outer dependent skirt 16c, a connecting web 16d and lugs formed on the outer skirt identified by the reference numeral 16e. The male mold core structure identified by the reference numeral 17 extends into the cavity 12 through bore 19 in the lower insert 21 located in the lower insert holder 23. The bore 19 is coaxial with the female cavity 12. The male mold structure 17 is composed of a principal cylindrical core 25, a surrounding segmented sleeve 27 located telescopically within surrounding fingered collar 29. The principal core 25 has an upper reduced end positioned (in FIGS. 1, 4, 7 and 10) within the cavity 12 and has formed on its exterior surface thread projections 25a which form threads on the interior of inner skirt 16b, while the upper end of the principal cylindrical core 25 forms the underside surface of top wall 16a of the closure cap. Surrounding the core 25, there is a segmented sleeve 27; the configurational details of which are shown more clearly in FIG. 10. As can be seen, the upper one-half end region of sleeve 27 is segmented by three vertical grooves 27a into three principal regions 27b having a uniform outside peripheral circumference. The grooves 27a extend from the upper end 27c at a given width to a shoulder 27d wherein the groove widens as shown, proceeding thence to edge 27e which extends peripherally along the bottom margin of each of the segments 27b. The recessed surface of grooves 27a is coextensive with the reduced peripheral surface 27f which characterizes the lower half region of sleeve 27 beneath edge 27e. The sleeve 27 has a central bore 27g which slidably engages the outer peripheral surface of threaded end core 25, as described. In fully telescoped relation as in FIGS. 1–7, the upper edge of sleeve 27 identified by the reference numeral 27e in combination with the mold cavity 12 defines a space or void cavity for plastic to fill, thereby forming the annular flexible web 16d.

Outer sleeve 29 includes an inner peripheral surface 29a definitive of a collar-like ring base 29b from which extends integrally upwardly a plurality of fingers 29c. The fingers 29c have an inner surface which define, in aggregate, the same inner circumferential surface 29a as the lower collar 29b and thus slide telescopically onto the lower end 27f of sleeve 27; the fingers 29c intermeshing slidingly with the grooves 27a. The fingers 29c have the same thickness as the depth of the grooves 27a and their edges are essentially congruent with the edges of the grooves 27a, with the exception that shoulders 27d of grooves 27a and shoulders 29d of the fingers 29c cooperate to leave a void which, as shown in FIG. 1, is filled with the plastic to form lugs 16e. The plastic proceeds through the cavity by injection pressure to completely fill the spaces between the core assembly 17 and the female cavity 12.

Referring again to FIG. 10 by way of summary, the sleeve 29, characterized by upstanding fingers 29c, slides telescopically onto the lower region of the sleeve 27 with the fingers proceeding slidingly into grooves 27a of segmented sleeve 27. It may at this point be noted that the vertical edges 29e of the fingers 29c, when intermeshed with the grooves 27a, abut the edges 27h of grooves 27a, leaving the void between the shoulder 27d of the sleeve 27 and shoulder 29d on the fingers. The shoulders, particularly the shoulders 27d, are slightly inclined, as shown. While the shoulder 29d is essentially horizontal as shown in this described embodiment, these latter shoulders may also be inclined to change the configuration of the lug. Sleeve 27 telescopes slidingly and axially onto the core 25 having the threaded end which in turn is reciprocably axially shiftable into and away from the female mold cavity 12 of insert 11. Movement of the core 25 after molding is accomplished by a counter-clockwise rotation, indicated by the arrow A, until the threads 25a are free of the formed threads and the inner skirt of the molded closure cap, whereupon downward away movement of the core 25 can proceed as desired. The downward movement of core 25 can be accomplished by rack and pinion (not shown).

Referring again to FIGS. 1–9 it can be seen that the parts described are fully assembled in molding position in FIG. 1 with the closure cap having been formed in the cavity defined by the spacing of the several parts. With the fingered sleeve 29 fully intermeshed on sleeve 27 as far as it will go, the outer surface of the fingers 29c completes the grooves in the sleeve 27, making a smooth peripheral outer surface defining the interior surface of the closure cap outer skirt 16c. At the same time, the sleeve 27 and fingers 29c fill the void or annular passageway between the outer skirt 16c and the inner skirt 16b.

Figure 4:
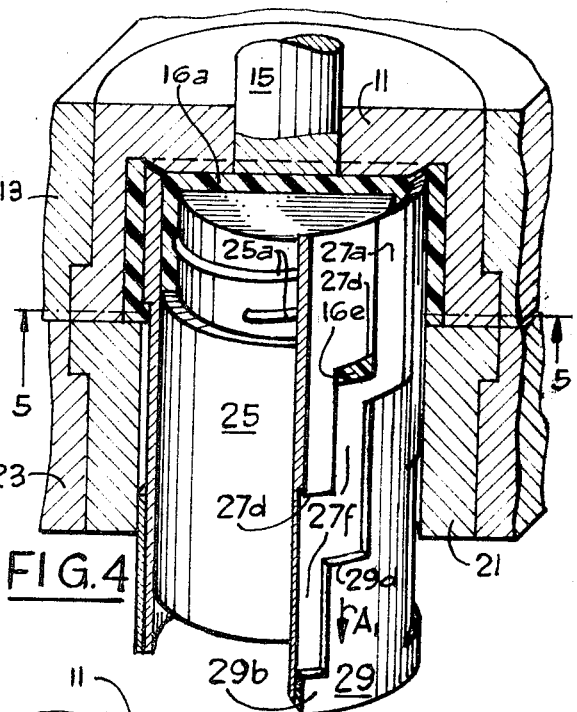
FIG. 4 is a view similar to FIG. 1 but showing one mold member, specifically a sleeve, moved from the engaged position.
Figure 2:
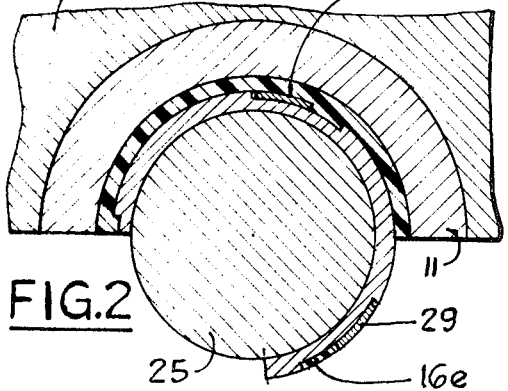
FIG. 2 is a sectional view taken on the line 2—2' of FIG. 1, again with parts broken away for clarity and, as well, simplicity of illustration.
Figure 5:
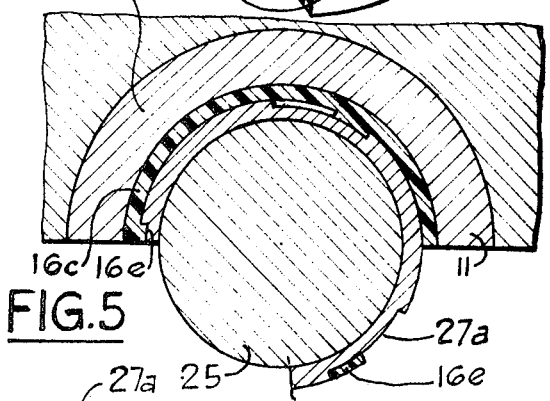
FIG. 5 is a sectional view taken on the line 5—5 of FIG. 4.
Figure 3:
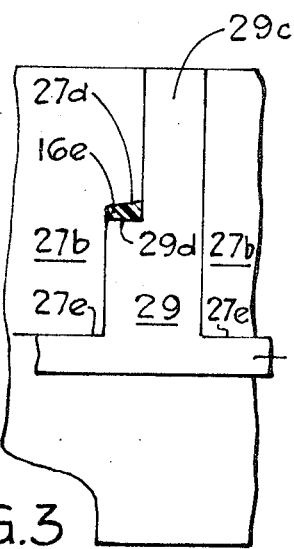
FIG. 3 is a schematic side elevation view of one segment of the mold structure assembly shown in FIG. 1.
Figure 6:
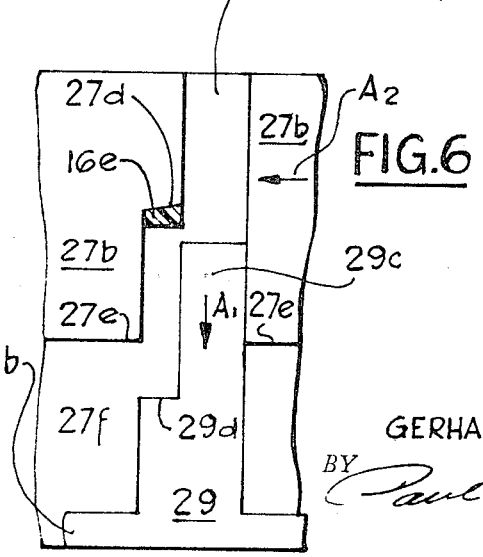
FIG. 6 is a view similar to FIG. 3 showing the relationship of the members with one member, e.g., the sleeve, partially axially moved away from the situs of molding.
Figure 7:
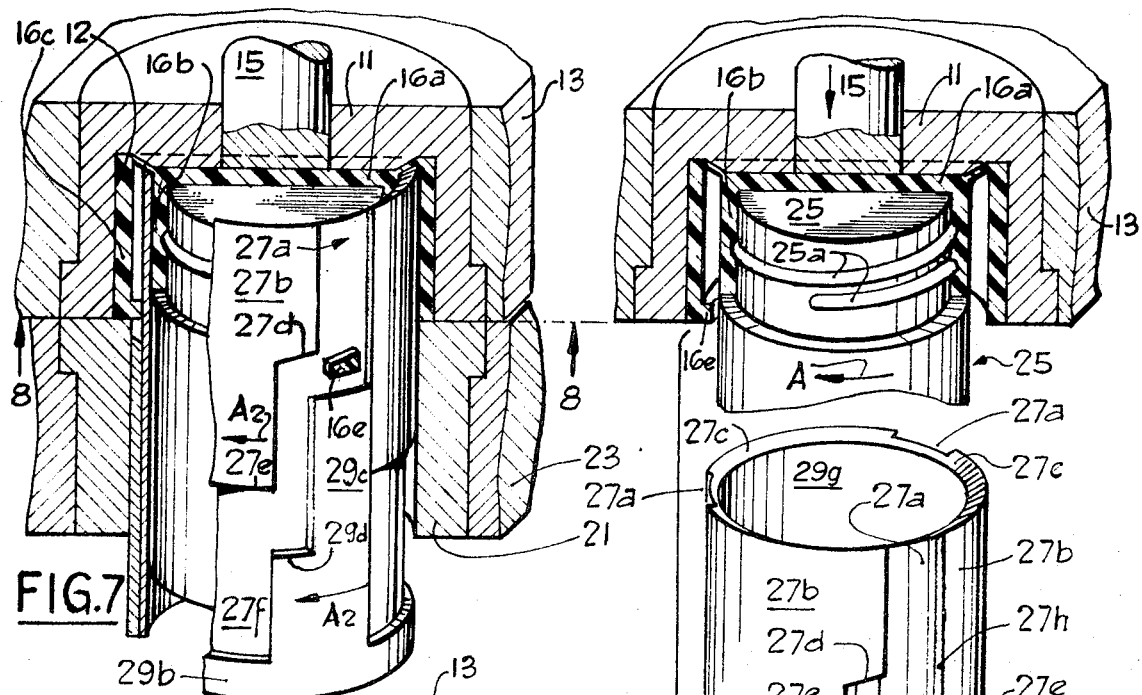
FIG. 7 is a view very much like FIG. 4 but showing the mold structure following a further movement of the component members.
Figure 8:
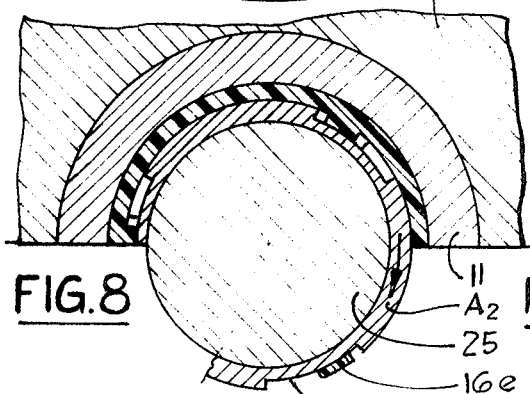
FIG. 8 is a sectional view taken on the line 8—8 of FIG. 7.
Figure 9:
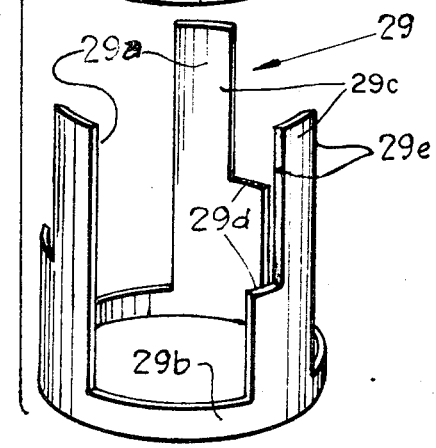
FIG. 9 is a view similar to FIGS. 3 and 6 but showing the relationship of the mold members in the final designed position, ready for freeing of the molded part.

Reference to FIGS. 4 and 5 reveals the first step in "after molding" disassemblement of the mold core structure in which the fingered sleeve 29 is moved axially downward, as indicated by the arrow in FIGS. 4 and 6. The movement of the outer sleeve 29 downward may be accomplished by known means such as an arrangement of driven gears or cams. Such arrangements and methods of powering same are well understood in the art and need not be described herein.

In the lower position, the vertical edge 29e of sleeve 29 abuts vertical edge 27h of the segmented sleeve 27. By reason of this abutment, radial movement applied to sleeve 27 (by cam or the like) simultaneously moves fingered sleeve 29 with core 25 remaining stationary together with the plastic part, whereupon the parts assume the relative position shown in FIGS. 7 and 9. In this position, the lugs are situated directly above the topmost edges of finger 29c which, in turn, are in vertical alignment with grooves 27a which, of course, are located between the major peripheral segments 27b of sleeve 27. At this point, sleeve 27 is moved axially downwardly, telescopically disengaging itself from the main threaded core 25 (see FIG. 10). This leaves core 25 in its uppermost position with the threaded end within the female cavity and still threadingly engaging the molded part as shown in the upper part of FIG. 10. It will be appreciated that the described movements result in a "freeing" of the three 120° spaced lugs 16e.

As indicated previously, the disengagement of the core 25 and the female mold part with ultimate release of the cap closure itself can proceed from this point in several different manners; all of which are well known in the art and need not be described in detail. Suffice it to say that the core parts 27 and 29 and the lower mold half 23 are removed, leaving the female cavity core 25 and the molded cap as shown in the upper region of FIG. 10. Complete removal of the cap can then be initiated by either downward turning disengagement (unthreading) of the core 25 or straight downward movement of the core 25. In the first instance, the cap is left held within the female cavity 12 from which it can be removed by knock-out pin 15. In the second instance, the cap is retained on the threaded core head 25 from which it can be "spun off" by suitable auxiliary spinoff devices.

The actual movement of the molten plastic to the mold cavity does not form a part of the present invention. Suffice it to say that the mold parts pictured above are provided with one or more suitable internal "sprue" passageways which fluidly connect the cavity, defined between the core mold structure parts and the female mold 12, and a suitable reservoir of molten plastic. This is usually a cylinder fitted with a reciprocable ram which, when activated, forces the molten plastic to move through the "sprue" passageways to the cavity as just described.

In the drawings, for simplicity of illustration, the arrangement is shown as a single cavity setup. It will be appreciated, however, that the structure, for example, as shown in FIG. 1, may comprise one single head of a plural-headed rotary arrangement controlled to move in a circular path in which the lowermost regions of the principal core 27, sleeve 27 and sleeve 29 are controlled by suitable cam surfaces, gears and the like to effect, as the mold structure proceeds in "stop and go" fashion from station to station or in continuous fashion, relative movement of the parts as hereinabove described.

A most important feature of the present invention resides in the nesting intermeshing cylinder cores which provide an arrangement for molding a lug on the interior surface of the depending skirt of a closure cap.

A most preferred embodiment of the present invention is the one illustrated featuring mold core structures designed to yield a double skirted cap closure with the inner skirt featuring threads for threading engagement with a like threaded neck finish of a container. This type of a closure is capable of complete fluid-tight sealing with an appropriately designed container, providing an ultimate package adapted to contain liquid in a leakproof container. Further with this type of a closure cap, as the threads are being securely tightened, the lugs formed on the interior surface in the manner described engage the lugs, dents or projections on the container neck, shoulder or the like, which dents, projections or the like are radially disposed cooperatively with the male threads on the neck finish in such fashion that as sealing is obtained, the locking feature is effected, whereupon reverse turning of the closure by radial movement of the outer skirt is impossible. Actually, counter-clockwise rotation of the cap closure, specifically the outer skirt, can be effected only by a first downward movement of the outer skirt to disengage the lugs on the outer skirt from the lugs or dents on the container neck, shoulder or the like, whereupon the entire closure can be rotated in a counter-clockwise direction while simultaneously holding this outer skirt flexed downwardly as permitted by the flexible web 16d. After a few degrees of turning, the lugs are disengaged sufficiently that the downward pressure on the outer rim region of the closure can be terminated and only radial movement continued to threadingly disengage the inner skirt formed threads from the threaded neck of the container to complete opening of the closured container whereby access may be had to the contents, whatever they may be.

Referring now to FIG. 11, there is disclosed an alternative embodiment of the present invention in which the core and sleeve components retain the essential feature as described in connection wtih FIGS. 1–10 but contained in a structure designed to yield a molded closure featuring a single depending peripheral skirt having lock lugs formed thereon. Reference numeral 51 identifies a mold insert featuring a female cavity 52; the insert being set in holder block 13. As shown in the upper segment of FIG. 11, the cavity contains a closure cap 60 located in the cavity defined by the spacing between the recessed wall of the female mold cavity and the core structure assembly identified generally by the reference numeral 80. The core structure assembly 80 is also shown in its retracted position and partially disengaged in the lower portion of FIG. 11. The core structure 80 is composed of a solid core member 81 having an outer surface configuration essentially identical to the sleeve 27 of FIG. 10, differing therefrom in the fact that it is a solid core as opposed to a hollow sleeve. As to its outer surface configuration, it features a principal segmented region 81b and a reduced circumferential area 81f and, additionally, grooves 81a separating the principal segments 81b. All of the parts of the member 81 in common with the sleeve 27 in the embodiment of FIG. 10 will bear the same letter subscripts. The upper end of member 81 differs from sleeve 27 in that, as indicated, it is solid, as defined by a planar circular wall 83 surrounded by an annular groove 85 and an upper annular angled edge 87. These just-described constructional features of the upper end of core 81 are definitive of the underside surface of the top wall 61 of the closure cap 60. As can be seen, the wall 61 is of generally uniform thickness and contains at its periphery a minor skirt 62 corresponding to the groove 85 and connected by web 63 with the principal annular depending skirt 64 which has projecting radially inward therefrom locking lugs 65, only two of which are shown. The minor skirt 62 does not feature threads as the inner skirt 16b in the embodiment of FIGS. 1–10 but rather is beveled as at 62a for being compressed against an appropriately designed rim finish of a container as the lugs 65 engage appropriate lug engaging members or dents on a container neck, finish and the like. The minor skirt 62 may, of course, be modified in its location and its dimension. Thus, it may be located radially inward and operate as a spacer for a disk-type fitment or the skirt 62 may be replaced by a more centrally located projection adapted to engage a separate insert plastic fitment; the projection serving perhaps as a centering part; the fitment being designed to compress against the finish or rim of the container onto which the closure cap is to be applied.

Reference numeral 89 (FIG. 11) identifies the collar sleeve corresponding to the member 29 in FIG. 10. The collar sleeve 89 will have its separate component parts identified by the same subscript letters as the corresponding part 29. As can be seen, the fingers 89c project up into the grooves 81a of core 81, with the shoulder 89d being spaced from the corresponding shoulder 81d of the segmented cylinder, leaving the void for the lug 65, as shown in the upper segment of FIG. 11. The above description applies with respect to the other two grooves 81a to produce three lugs corresponding to the three grooves 81a shown in the segmented cylinder 81 at the bottom half of FIG. 11. With the mold cycle complete as shown in the upper half of FIG. 11, the action is simply one of downward shifting movement of the collar fingered sleeve 89 to the position shown generally in the lower half of FIG. 11, followed by movement of the segmented core 81 in the direction indicated by the arrow A4 whereupon the collar sleeve 89 will also shift due to abutment of vertical edges, leaving the closure cap stationary and with the lugs 65 in vertical alignment with grooves 81a so that the core 81 and sleeve 89 may both be further shifted downwardly by appropriate gear, cam or lever action, leaving the closure cap 60 within the confines of the female mold 52. At this juncture, circular knock-out pin 66 may be urged downwardly to knock the molded cap out of the female cavity.

Reference may now be had to FIG. 12 wherein there is shown a closure cap 101 featuring a central top wall 103, an outer rim 105 connected to the wall 103 by a generally U-shaped flexible web 106, and a depending skirt 108 connected to the rim 105 and having lock lugs 109 thereon. The inverted U-shaped web defines in the top surface of the clousre an annular groove 110. As shown, the closure cap 101 is resting on the rim of a container 111; the rim being designated by the reference numeral 112. As shown, it is slightly beveled and is contacting the inverted U-shaped web 106. The lugs 109 engage like lugs 113 formed on the container. The U-shaped web 106, as viewed in section, includes an annular vertical wall segment 106a and an angular segment 106b; the vertical segment 106a depending from the outer edge of central wall 103 and connecting with the lower terminus of angularly disposed segment 106b whose upper terminus connects with the upper inner region of skirt 108.

In FIG. 13, the closure is shown with the lugs of the closure in locked engagement with the corresponding lugs of the container; the engagement of the lugs proceeding by appropriate cam surface action to urge the web 106 compressingly against the rim 112 so that the annular vertical wall segment 106a is angularly disposed inwardly as shown, with the wall segment 106b defining a shallower angle to complete effective sealing engagement with the beveled rim edge 112.

The closure cap 101 is shown in FIG. 14 within the confines of a mold defined by an upper mold half 120 and the lower half 121. Reference numeral 122 identifies the parting line. The upper surface of the cap 101 is defined by the underside surface of the mold insert 120a. The underside of the cap closure 101 is formed and shaped by reason of the configuration of mold core 125 and surrounding sleeve 126. The core 125 and sleeve 126 are otherwise inclusive of the constructional features embodied in core 81 and sleeve 89 as described in connection with the embodiment illustrated in FIG. 11. Thus, the core 125 includes the grooves and recessed peripheral end while sleeve 126 includes fingers; the fingers and grooves cooperating to define a void or cavity for the lug 109 much in the identical manner as the lug 65 in the embodiment of FIG. 11. The construction of the core and sleeve, of course, permits axial downward movement of the sleeve 126, followed by a rotational movement of the core and the sleeve, with the result that the lug remains stationary but, due to the rotational movement, in alignment with the groove, not shown but described in previous embodiments, whereupon the core can be axially moved downward, freeing the lug and permitting the mold halves to be parted and the molded cap to be knocked out by an appropriate knock-out pin.

Without the mold structure of the present invention, the closure cap structure 101 cannot be molded since there are no known mold structures or methods capable of molding the configuration of cap 101. The telescoping core of the present invention, on the other hand, with its included lug void and lug path groove permits the molding of the closure cap 101 which, by reason of its shape, has a number of advantages, principal amongst which is the fact that the web can be molded to any thickness by appropriate design of the upper mold half 120a to build into the closure cap a greater or lesser resistance to compression as may be needed to move the lugs downwardly through a "push and turn" action, providing thereby safe, purposeful disengagement of the closure cap from the container. Other advantages of the closure cap 101 reside in the simplicity of its design and its one-piece structure.

Reference to FIGS. 15–17 reveals another closure cap; the designed features of which are made possible by the cor assembly structure in accordance with the present invention and particularly the embodiment of FIG. 11. This closure cap identified by the reference numeral 150 is quite similar to the closure cap 101, differing only in that the web identified by the reference numeral 156 is, when viewed in section, a symmetrical approximate semi-circle. No other details of its construction nor its molding formation will be described in the interest of brevity. Suffice it to say that the web is shown in FIG. 16 with the closure cap firmly engaged onto the closure 160, resulting in a flattening of the web, as shown, to insure the sealing of the closure, providing a leak-proof package. Reference to FIG. 17, taken with FIG. 11, will readily reveal that the closure cap is capable of being molded as illustrated. This cap, like cap 101, is capable of being molded only in accordance with the molding technique outlined in accordance with the description and illustration of FIG. 11.

From the foregoing description, it will be appreciated that there has been and is provided herein a novel yet simple core structure adapted for molding integral lugs on the inside surface of the depending skirts of skirted closure caps formed usually of a moldable plastic. The mold parts feature mating component parts which are capable of repeated and cyclic movement into and out of telescoping relationship without damage to each other. This is in sharp contrast to another known mold arrangement which features a plurality of relatively small pins which extend downwardly from a top mold half to penetrate through the molded cap to assist in forming the integral lugs. Unfortunately, these pins leave holes in the top wall of the molded cap and are quite subject to breakage during the reciprocatory movement of the cooperating mold parts and aggravated by the fact that these pins are quite small and fragile. Frequently, in fact, these pins break off in contact with a "hung up" molded cap part. The mold structure in accordance with the present invention is capable of being manufactured at a relatively reasonable cost and is adapted for production on a large scale without any undesired product deformation or unusual shapes being encountered. It will be further appreciated that the presence of threads is not an absolute necessity since threads are only one means for securing a container closure to the container in leak-proof fashion.

As indicated earlier herein, a closure may rely upon the resilience of the plastic material of which molded and the configuration of the closure cap to permit reasonably leak-proof sealing engagement of a closure to a container by means of engagement of a lug or dent formed on the container and an appropriately engaging lug of the type described herein formed on the interior surface of the skirt.

Modifications may be resorted to without departing from the spirit and scope of the present invention.

I claim:

1. A core assembly adapted in combination with a spaced surrounding female mold surface to mold a closure cap, said cap having a top wall and a depending skirt having formed thereon at least one generally inwardly projecting lug, said lug being adapted for releaseable locking engagement with a corresponding dent, projection or the like formed on a container neck, finish, shoulder or the like, said core assembly including a principal cylindrical core and a sleeve, said core and sleeve being adapted for relative coaxial reciprocating, telescoping engagement with each other and said female mold core, said core having a principal segmented peripheral surface at the end proximate said female mold, a recessed peripheral surface at the other end and at least one groove extending to the female mold end, said groove having a recessed surface, said sleeve including at least one edge-defined finger corresponding generally in shape to the groove and being slidably receivable in said groove as said sleeve telescopically embraces the recessed peripheral surface of said core, said finger having a radial thickness corresponding to the radial depth of said groove, the edges of said groove and its associated finger cooperating to leave a void definitive of said lug.

2. The invention as claimed in claim 1, wherein the number of lugs is two and the number of grooves and fingers are at least two.

3. A core assembly as claimed in claim 1, wherein said wider groove includes an offset wider region defined by an inclined shoulder, said wider region merging with said recessed peripheral surface of said cylindrical core.

4. A core assembly as claimed in claim 3, wherein said finger has a lateral offset shoulder positioned such that with the sleeve in fully telescoped relationship with said principal core, there is defined a space between said groove shoulder and said finger shoulder, serving as a void cavity for forming said lug.

5. The invention as claimed in claim 4, wherein said groove extends completely to the end of said core nearest said female mold.

6. The invention as claimed in claim 5, wherein said sleeve is adapted to move axially away from the female mold, followed by rotation of said cylindrical core to a position wherein the formed lug is aligned with said groove.

7. A core assembly adapted in combination with a spaced surrounding female mold surface to mold a closure cap, said cap having a top wall and a depending skirt having formed thereon at least one generally inwardly projecting lug, said lug being adapted for releaseable locking engagement with a corresponding dent, projection or the like formed on a container neck, finish, shoulder or the like, said core assembly including a principal cylindrical core, a first sleeve and a second sleeve, said core and sleeves being adapted for relative coaxial reciprocating, telescoping engagement with each other and said female mold, said first sleeve having a principal segmented peripheral surface at the end proximate said female mold, a recessed peripheral surface at the other end and at least one groove extending axially to the end proximate said female mold, said groove having a recessed surface, said second sleeve including an edge-defined finger corresponding generally in shape to the groove and being slidably receivable in said groove as said second sleeve telescopically embraces the recessed peripheral surface of said first sleeve, said finger having a radial thickness corresponding to the radial depth of said groove, the edges of said groove and its associated finger cooperating to leave a void definitive of one of said lugs.

8. The core assembly as claimed in claim 7, wherein said grooves and fingers are at least two in number.

9. A core assembly as claimed in claim 8, wherein said grooves are wider proximate said recessed peripheral surface of said first sleeve.

10. The invention as claimed in claim 9, wherein said grooves extend completely to the end of said first sleeve nearest said female mold.

11. The invention as claimed in claim 10, wherein said sleeves are rotatable together, independent of said core, and said grooves define a path for freeing said lugs as said sleeves move axially away from the female mold.

12. The invention as claimed in claim 10, wherein said second sleeve is adapted to move axially away from the female mold, followed by rotation of both of said sleeves to a position wherein formed lugs are aligned with said grooves.

13. The core assembly as claimed in claim 7, wherein said principal cylindrical core includes one end proximate said female mold which is of reduced diameter and has threads formed thereon.

14. The core assembly as claimed in claim 7, wherein said principal cylindrical core includes one end proximate said female mold which is of reduced diameter and has threads formed thereon.

15. A mold assembly adapted in combination with surrounding female mold surface to mold a one-piece closure cap, said cap including a top wall and integral spaced inner and outer depending skirts connected by a flexible annular web, said outer skirt having formed thereon at least one generally inwardly projecting lug, said lug being adapted for releaseable locking engagement with a corresponding dent, projection or the like formed on a container neck, finish, shoulder or the like, said mold assembly including:
1. a principal cylindrical core having a reduced end portion definitive of the inner surface of said closure top wall and inner surface of said inner skirt of said closure cap,
2. a hollow, axially shiftable, cylindrical first sleeve having an inner surface slidably receptive of said principal core and defining, between said inner surface and the reduced end portion of said principal core, an annular cavity defining, in turn, said inner depending skirt of said cap, said first sleeve having a segmented peripheral surface proximate said reduced end of said core and being of reduced wall thickness at the other end and having a spaced recessed groove extending from said region of reduced wall thickness axially to the other end, and
3. a second axially shiftable, rotatable sleeve including a ring-like end extremity having an inner surface slidably receivable of the reduced thickness end of said first sleeve core and at least one finger extending away from said ring having an inner surface complementarily embrasive of said cylindrical reduced end region of said first sleeve and being generally slidably receivable in said groove, said finger having a radial thickness generally corresponding to the radial depth of said groove, said finger and groove being generally complementary when in telescoped relationship with said finger extending into said groove but leaving a void or cavity defining said lug.

16. The core assembly as claimed in claim 15, wherein said reduced end includes threads.

* * * * *